United States Patent
Garthe et al.

(10) Patent No.: US 11,127,237 B2
(45) Date of Patent: Sep. 21, 2021

(54) METHOD FOR CONTROLLING ACCESS TO HAZARD ZONES

(71) Applicants: Thyssenkrupp AG, Essen (DE); Thyssenkrupp Hohenlimburg GmbH, Hagen (DE)

(72) Inventors: Frank Garthe, Altena (DE); Thomas Ewert, Hagen (DE); Joerg Jungjohann, Breckerfeld (DE); Oliver Wolff, Hagen (DE)

(73) Assignees: THYSSENKRUPP AG, Essen (DE); THYSSENKRUPP HOHENLIMBURG GMBH, Hagen (DE)

( * ) Notice: Subject to any disclaimer, the term of this patent is extended or adjusted under 35 U.S.C. 154(b) by 0 days.

(21) Appl. No.: 16/181,743

(22) Filed: Nov. 6, 2018

(65) Prior Publication Data
US 2019/0139339 A1 May 9, 2019

(30) Foreign Application Priority Data

Nov. 7, 2017 (DE) ...................... 10 2017 219 726.9

(51) Int. Cl.
*G06Q 10/06* (2012.01)
*G08B 21/22* (2006.01)
(Continued)

(52) U.S. Cl.
CPC ............. *G07C 9/28* (2020.01); *G06F 16/951* (2019.01); *G06Q 90/205* (2013.01);
(Continued)

(58) Field of Classification Search
CPC ...... G06F 16/951; G06F 21/552; G06F 1/163; G06F 19/00; G06F 19/3418;
(Continued)

(56) References Cited

U.S. PATENT DOCUMENTS

| 7,164,354 B1 * | 1/2007 | Panzer ............... G08B 21/0202 340/539.15 |
| 2004/0140899 A1 | 7/2004 | Bouressa |

(Continued)

FOREIGN PATENT DOCUMENTS

| DE | 19708841 A1 | 9/1998 |
| DE | 10347894 A1 | 5/2005 |

(Continued)

OTHER PUBLICATIONS

Office Action for corresponding German Application No. 102017219726.9 dated Aug. 8, 2017.
(Continued)

*Primary Examiner* — Dionne Pendleton
(74) *Attorney, Agent, or Firm* — Harness, Dickey & Pierce, P.L.C.

(57) ABSTRACT

The invention relates to a method for controlling access to hazard zones (202; 206) by a server (100), the server (100) comprising a processor (102) and a memory (106), the memory storing instructions in a form of an evacuation module (108), the instructions being executable by the processor, the method comprising electronically registering the presence of persons in the hazard zones (202; 206) by reader devices (208) associated with the hazard zones (202; 206), the registering being performed by reading ID tokens uniquely associated with the persons by the reader devices (208).

16 Claims, 4 Drawing Sheets

(51) Int. Cl.
  G07C 9/28      (2020.01)
  G06Q 90/00     (2006.01)
  G08B 21/10     (2006.01)
  G08B 21/02     (2006.01)
  H04L 29/06     (2006.01)
  H04W 4/024     (2018.01)
  G06F 16/951    (2019.01)

(52) U.S. Cl.
  CPC ......... G08B 21/0272 (2013.01); G08B 21/10 (2013.01); G08B 21/22 (2013.01); H04L 65/102 (2013.01); H04W 4/024 (2018.02)

(58) Field of Classification Search
  CPC ...... G06F 19/3462; G06F 3/011; G06F 3/012; G06F 3/0481; G06F 3/0482; G06F 3/0484; G06F 3/04842; G06Q 90/205; G06Q 50/265; G06Q 10/00; G06Q 10/06311; G06Q 10/08; G06Q 90/20; G06Q 10/063; G06Q 10/06315; G06Q 21/22; G07C 9/28; G07C 11/00; G07C 2011/04; H04W 4/024; H04W 4/38; H04W 4/90; H04W 52/0254; H04W 52/0261; H04W 84/18; H04W 4/22; H04W 4/025; H04W 4/023; H04W 4/02; H04W 4/029; H04W 4/14; H04W 4/80; H04W 60/02; H04W 60/04; H04W 60/06; H04W 8/02; G01C 21/206; G01C 21/26; G01M 99/00; G08B 17/10; G08B 21/10; G08B 25/006; G08B 25/014; G08B 25/016; G08B 25/10; G08B 25/12; G08B 27/006; G08B 27/008; G08B 29/145; G08B 7/066; G08B 25/001; G08B 25/007; G08B 25/009; G08B 25/08; G08B 5/222; G08B 5/1115; G08B 90/90; G08B 17/113; G08B 21/02; G08B 21/0423; G08B 21/0446; G08B 21/0453; G08B 21/0461; G08B 21/0476; G08B 21/0484; G08B 21/0492; G08B 29/14; G08B 29/188; G08B 29/24; G08B 13/19684; G08B 19/00; G08B 21/0202; G08B 27/001; G08B 21/043; G08B 7/06; H04L 41/0609; H04L 41/0873; H04L 41/16; H04L 43/0817; H04L 43/12; H04L 43/16; H04L 63/1425; H04L 67/02; H04L 65/1016; H04L 65/1073; A61G 12/00; A61G 2203/12; A61G 2203/70; G16H 40/20; G16H 15/00; G16H 20/13; G16H 40/67; G16H 50/20; G16H 80/00; A61B 2562/0219; A61B 5/02055; A61B 5/0402; A61B 5/1118; A61B 5/6803; A61B 5/681; A61B 2090/064; A61B 2560/0209; A61B 2560/0252; A61B 2560/0257; A61B 2560/0456; A61B 2560/0475; A61B 2562/0223; A61B 2562/0261; A61B 5/0006; A61B 5/0008; A61B 5/0013; A61B 5/002; A61B 5/0022; A61B 5/0075; A61B 5/0077; A61B 5/01; A61B 5/02416; A61B 5/0261; A61B 5/0476; A61B 5/0488; A61B 5/053; A61B 5/1112; A61B 5/1116; A61B 5/1117; A61B 5/14551; A61B 5/4875; A61B 5/6806; A61B 5/6807; A61B 5/6824; A61B 5/6826; A61B 5/6891; A61B 5/7221; A61B 5/7264; A61B 5/7445; A61B 7/04; A61B 7/045; A61B 8/00; A61B 8/06; A61B 8/0808; A61B 8/488; A61B 8/565; A61B 5/1115; A61B 90/90; A62B 5/00; G02B 27/01; G02B 27/017; G06N 20/00; G06N 3/006; G06N 3/0445; G06N 99/005; G06T 17/20; G06T 2215/16; G09G 2340/0492; G09G 2340/14; G09G 3/001; G09G 5/00; G09G 5/36; H04M 19/04; H04M 2250/12; H04M 3/5116
  See application file for complete search history.

(56) References Cited

U.S. PATENT DOCUMENTS

| | | | | |
|---|---|---|---|---|
| 2009/0191869 | A1* | 7/2009 | Siegel | H04W 60/04 |
| | | | | 455/435.1 |
| 2018/0151037 | A1* | 5/2018 | Morgenthau | G08B 7/06 |
| 2019/0005440 | A1* | 1/2019 | Racz | G06Q 10/00 |
| 2019/0035242 | A1* | 1/2019 | Vazirani | G08B 15/00 |
| 2019/0108467 | A1* | 4/2019 | Koppel | G06Q 10/063 |

FOREIGN PATENT DOCUMENTS

| | | |
|---|---|---|
| DE | 102006025363 A1 | 12/2007 |
| DE | 112008001636 T5 | 8/2010 |
| DE | 202012103265 U1 | 12/2013 |
| EP | 3125205 A1 | 2/2017 |
| WO | WO-2016/187573 A1 | 11/2016 |

OTHER PUBLICATIONS

EESR for corresponding European Application No. 18205022.9 dated Jan. 1, 2019.
European Office Action dated Jun. 19, 2020 for corresponding European Application No. 18205022.9.

* cited by examiner

METHOD FOR CONTROLLING ACCESS TO HAZARD ZONES

CROSS-REFERENCE TO RELATED APPLICATIONS

The present application claims priority under 35 U.S.C. § 119 to German Patent Application No. 102017219726.9, filed on Nov. 7, 2017, in the German Patent and Trademark Office, the entire contents of each of which are hereby incorporated by reference.

The invention relates to a method for controlling access to hazard zones by a server, a method for operating a mobile telecommunication device, a computer program product, a system for controlling access to hazard zones, and a mobile telecommunication device.

In the area of factory sites and technical facilities crisis situations repeatedly occur which require the evacuation of the employees located there. For this purpose, specially trained emergency forces can search the corresponding critical company zones that have to be evacuated for persons located there in order to rescue these persons. However, this can be very time-consuming, especially if the affected zones are distributed over a large area of the entire factory site. In addition, an intensive search in hazard zones for any persons still present there is also associated with a danger to the rescue forces on duty.

The invention has as its object the elimination of these disadvantages. The object is achieved by the features of the independent patent claims. Preferred embodiments of the invention are given in the dependent claims.

A method for controlling access to hazard zones by a server is described, wherein the server comprises a processor and a memory, wherein the memory stores instructions in a form of an evacuation module, wherein the instructions are executable by the processor, wherein the method comprises electronically registering the presence of persons in the hazard zones by reader devices assigned to the hazard zones, wherein the registering is performed by reading ID tokens uniquely associated with the persons by the reader devices, wherein the execution of the instructions by the processor causes the server to:
a) retrieve, for the persons whose presence is registered, person-specific data from at least one first database, wherein the person-specific data comprise personal master data,
b) retrieve, for the reader devices used to register the presence of the persons, data specific to the respective hazard zone from at least one second database, wherein the data specific to the hazard zone comprise location information of the hazard zone,
c) generate evacuation data, the evacuation data comprising the personal master data of the persons whose presence is registered and the data specific to the hazard zone, the data specific to the hazard zone being assigned to the person-specific data in accordance with the presence of the persons in the respective hazard zone,
d) transmit the evacuation data to a mobile telecommunication device for buffering of the evacuation data by the mobile telecommunication device,
e) repeat automatically and cyclically the steps a)-d) at specified time intervals.

Embodiments of the invention may have the advantage that, first of all, due to the presence of the evacuation data on the mobile telecommunication device, reliable information is available as to whether and to what extent persons are present in critical company areas such as cellars or in certain machine areas. Rescue forces can thus limit their deployment to those areas of which it is actually known that persons are to be rescued there. By the fact that the presence of persons in corresponding hazard zones is carried out electronically by reading ID tokens uniquely associated with the persons by reading devices, which are installed in particular at the entrances and exits of the hazard zones, a presence monitoring of persons in these hazard zones can first of all be realized in a very reliable manner. This is implemented in a "very streamlined" manner in terms of data technology, in that initially only a unique identification of the persons is required, which is then used by the server's evacuation module to retrieve person-specific data from the first database. For example, it is sufficient to transmit a unique identification of a person from one of the reader devices to the server in wired or wireless digital form, so that the server can then query further personal data containing the personal master data from the first database.

Also in a very streamlined manner in terms of data technology, only information in the form of an identifier is transmitted to the evacuation module of the server, which enables the server to query specific data from the second database for the respective hazard zone. Also in this case, an (e.g. unique) identifier of either the reader device or the hazard zone itself, for which the evacuation module can then retrieve the specific location information of the hazard zone by querying the second database, is sufficient.

Evacuation data can then be generated by the evacuation module using the person-specific data and the location information of the hazard zone and transmitted to the mobile telecommunications device.

Since the mobile telecommunication device buffers the evacuation data, this can have the effect that in an emergency, even if the server fails, it is ensured that information is available on the hazard zones for which evacuation measures must be carried out. This is because it is usually the case that for example in the event of a power failure or even a complete destruction of the server infrastructure, the server and its backup facilities may be affected, but mobile telecommunications devices themselves may be unaffected. The reason is that, for a considerable part of their time the mobile telecommunications devices are not connected to the power grid, which also feeds the server, so that overvoltage damage is hardly to be feared in this respect. Finally, it must be assumed that the step d) of the method described above is carried not only for a single mobile telecommunication device but for a large number of mobile telecommunication devices, so that the probability is significantly high that at least one of the mobile telecommunication devices will have the evacuation data available for a corresponding rescue operation due to the buffering of the evacuation data.

The mobile telecommunication devices or the mobile telecommunication device can, for example, be a smartphone of the head of operations of the plant fire brigade or also a smartphone which is made available to the mobile emergency forces of plant security.

In this respect, the present invention may have the advantage that, even in serious emergencies with the failure of a considerable part of the server infrastructure, rescue team leaders are able to make statements about whether and how many people are in which hazard zones such as cellar zones or basement areas (=contiguous cellar zone that can be entered/leaved via several entrances). In this respect, the rescue team, such as the plant fire brigade, no longer has to walk down all cellar corridors for inspection purposes and thus does not enter the hazard zones itself. The rescue team is in a position to prioritize the securing of hazard zones on the basis of existing evacuation data and thus save human lives if necessary, as precise information on the whereabouts of persons to be rescued is available. The evacuation of hazarded zones is thus significantly shortened, as not all zones need to be secured anymore. This also reduces the duration of any production disruptions in production areas.

The term "ID token" means a device, such as a portable electronic device, such as a transponder or document. A transponder is a device which can communicate with a receiver via wireless communication and which, in the examples described above, is able to transmit information to corresponding reader devices which unambiguously enable identification of the persons associated with the ID token. For example, this may be a unique identifier such as an alphanumeric code that is transmitted wirelessly to the reader device. Wireless communication can include near-field communication, such as RFID communication.

In particular, the use of near-field communication technology such as RFID technology may have the advantage that it would enable the ID token to be captured in a highly targeted manner in a spatially restricted area (better accuracy, less than 1 m, preferably a range <10 cm) by a corresponding reader device. For correspondingly larger and more widespread zones, it may also be possible to use other wireless technologies such as WLAN or Bluetooth.

The term ID token can also refer to a document, whereby the term document refers to paper-based and/or plastic-based documents. This includes, for example, various documents in credit card format, chip cards, company IDs and other identification documents which are able to carry unique information identifying the user. The document itself may have a transmitter that wirelessly transmits information uniquely identifying the user to the reader device. However, it is also possible for the document to have a unique identifier printed on it to identify the user, e.g. in the form of a barcode or an alphanumeric code, so that the reader device reads the document optically.

The fact that steps a) to d) are repeated cyclically at specific time intervals ensures that the evacuation data is kept up-to-date on the mobile telecommunication devices or the mobile telecommunication device. The time intervals can be predefined to be 5 minutes, 10 minutes or 15 minutes, for example. Other time intervals are also possible. As the evacuation data on the mobile telecommunication devices are not permanently updated, the data transfer volume and thus the server load are also reduced.

For example, due to the transmission of the evacuation data to the mobile telecommunication device, the evacuation data previously buffered in the mobile telecommunication device can be overwritten by the currently transmitted evacuation data. This may have the advantage that the storage requirements on the mobile telecommunication device are minimized.

In order to nevertheless be able to access the most up-to-date evacuation data in the event of evacuation, it is provided, in accordance with an embodiment of the invention, that the server receives an update request from the mobile telecommunication device, wherein steps a) to d) are then repeated immediately upon the receipt of the update request, irrespective of the cyclic repetition. In case of an evacuation, the head of operations can request a current evacuation list from the server at any time on his telecommunication device, for example a smartphone, PDA or a tablet computer. The server then transmits the corresponding evacuation data back to the mobile telecommunication device, as long as it has not failed and can transmit the data in return.

According to an embodiment of the invention, the evacuation data is transmitted by a server to the mobile telecommunication device via a push mechanism. This ensures that the server determines the time intervals at which evacuation data should actually be transmitted to the mobile telecommunication device. Thus it is conceivable that in normal operation (first operating mode) the server transmits the evacuation data to the mobile telecommunications device(s) in a first time interval like every 15 minutes. In a second operating mode, which corresponds to an increased hazard level, the update interval could be shortened to a second update interval, for example every two minutes. The number of operating states and associated update intervals can be freely defined. This may make it possible to update the evacuation data on the mobile telecommunication devices in line with current security requirements.

The second operating mode could become necessary, for example, if a hazardous condition is present, but a current concrete hazard is not yet given. If, for example, material is delivered to a company site by an appropriate transport which is hazardous to the health of the employees working there due to corrosive properties or extremely high toxicity, the server could be switched from the first operating mode to the second operating mode so that in the event of an evacuation "almost" real-time evacuation data is available. Only then, if a concrete accident is to be assumed with hazard to a zone of the company premises, the third operating mode "evacuation level" could be set and an update can be carried out e.g. in 30 second intervals.

It should be noted that in the context of the present description, the time intervals of the automatic cyclic repetition of steps a) to d) can also be specified specifically for different hazard zones. It is conceivable, for example, that in the above example of the delivery of the hazardous material, the evacuation data can only be updated for the hazarded delivery zone (for this hazard zone) at shortened time intervals and transmitted to the mobile telecommunications device or devices, whereas for other hazard zones the time intervals are not shortened. The evacuation data thus contain data on the presence of persons in general hazard zones, which are only updated for example every 15 minutes, and data on the presence of persons in the described delivery zone, which are updated every two minutes. If the push mechanism is selected in such a way that not the entire evacuation lists but only the changing parts of the evacuation data are sent to the mobile telecommunications device, the data transfer volume can be further minimized without having to accept any losses with regard to the currentness of the evacuation data for the currently highly hazarded zones.

According to an embodiment of the invention, each of the reader devices has a set of two receivers, wherein for each reader device a first of the receivers is assigned exclusively to a registration of the ID tokens for the respective hazard zone and a second of the receivers is assigned exclusively to a deregistration of the ID tokens for the respective hazard zone, wherein a person associated with one of the ID tokens is deemed to be present in the respective hazard zone when the ID token of that person has been read by the first receiver, and a person associated with one of the ID tokens is deemed to be no longer present in the respective hazard zone when the ID token of that person has been read by the second receiver.

For example, for each of the reader devices, the set of receivers is spatially separated from each other so that simultaneous reading of a particular ID token by both receivers is avoided. By the distinct separation of the reading devices in a set of two receivers for the registration and deregistration of the ID tokens, the advantage could arise that users could be able to carry out the registration or deregistration process for the corresponding hazard zone in a very simple and therefore not confusing way. In particular, this could prevent false alarms that could result from a person not deregistering from a hazard zone, leading to the presumption that if the person concerned has been present in the hazard zone for too long, something has happened to that person. Conversely, it could also be avoided that, due to incorrect multiple deregistration instead of registration in respect of a hazard zone, the person's entrance into the hazard zone would not be registered at all.

According to an embodiment of the invention, the reader devices are designed for registering the ID tokens for the respective hazard zone and for deregistering the ID tokens for the respective hazard zone, wherein a person associated with an ID token is no longer considered to be present in the respective hazard zone if the presence of the person associated with the ID token has been registered in a zone other than the respective hazard zone and/or has elapsed within a predetermined first period of time after the registration of the ID token of the person. This could have the advantage that the evacuation data could reflect with a very high probability the real presence or absence of persons in hazard zones. If, for example, after registering the presence of an employee in a certain cellar zone, the registration of the same employee for access to a meeting room or the pithead baths takes place sometime later at another reader device, it is assumed that this person can no longer physically be present in the previously registered hazard zone such as the corresponding cellar and it is concluded that the person had forgotten to deregister from the hazard zone.

The automatic assumption that a person is no longer present in the hazard zone when the predetermined first period after registration of the person's ID token has elapsed could have the advantage of avoiding "unclear states" in the system that could result from people forgetting to deregister from a corresponding reader device in a corresponding hazard zone. If, for example, the predefined first period is 14 hours, the system automatically cleans up every 14 hours for each employee, provided that this employee or person has not already deregistered independently from a corresponding hazard zone and has not been present there for longer than 14 hours in a corresponding hazard zone.

According to an embodiment of the invention, it is also possible that the registration of the presence of the person associated with the ID token in a zone other than the respective hazard zone comprises:
using one of the reader devices which is not associated with
  the respective hazard zone to re-register the ID token, or
registering the person associated with the ID token on to a
  time recording terminal outside the respective hazard
  zone.

A time recording terminal is typically used to record employees' overtime or undertime, allowing employees to record their working time conveniently. Consideration of the registration of the person associated with the ID token in a time recording terminal outside the hazard zone also helps to clean up the system and thus the evacuation list, since a person cannot be registered in a hazard zone at the same time as being at a time recording terminal.

According to an embodiment of the invention, the unique association of each ID token with the respective person is given via a unique identifier, whereby the retrieval of the person-specific data from the first database is carried out using the unique identifier as the primary key. It should be noted here that the person assigned to the ID token does not necessarily have to register at a time recording terminal using the same ID as the ID token. In particular, different identifiers can be used here, but these can then be processed in such a way that a unique assignment to one and the same person is possible. If the first database also contains time recording data in addition to personal master data, this is possible without any problems. If, on the other hand, a further database independent of the first database is used for time recording, a data comparison between the first and this further database could take place in such a way that a unique identifier of the person is read from the further database and this unique identifier is found in the first database, so that a corresponding data comparison is possible.

According to an embodiment of the invention, the registration of the presence of persons in the hazard zones comprises a reading of the unique identifier provided by the ID token by one of the reader devices, the reading being effected by near-field communication between the ID token and the reader device.

According to an embodiment of the invention, the registering of the ID token associated with the person at the time recording terminal comprises:
Recording the registration process of the person associated
  with the ID token on the time recording terminal by a time
  recording module,
Communicating, to the evacuation module, said recorded
  registration process by the time recording module, the
  communicating comprising transmitting such an information, which enables the evacuation module to uniquely
  identify the person associated with the ID token directly
  or using the first database, wherein execution of the
  instructions of the evacuation module further causes the
  server to register the person associated with the ID token
  as no longer present in the respective hazard zone based
  on the transmitted information.

According to an embodiment of the invention, the method further comprises accessing a third database, wherein, for each of the hazard zones in which the presence of persons is registered, the third database comprises:
Information obtained by reading the ID tokens, the information comprising a unique identification of the persons
  associated with the ID tokens,
A unique identification of the reader devices with which the
  information was acquired and read by the ID tokens
  and/or location information of the hazard zones for which
  the information was acquired by the ID tokens, and
A timestamp of a point in time at which the information was
  acquired and read by the ID tokens;
wherein the retrieving of the person-specific data is performed using the unique identification of the person and
  the retrieving of the data specific to the respective hazard
  zone is performed using the unique identification of the
  reader device.

For example, it is possible to record and store in the third database the electronic registration of the presence of persons in the hazard zones in real time, so that the third database basically reflects the current status of the presence of persons in the hazard zones. Since the third database contains only references to persons and hazard zones as well as time information, the third database can be kept very compact despite its real-time capability, which reduces the server speed and also the data processing volume.

If a person is deregistered from a hazard zone, either by the person himself or due to one of the automatic mechanisms discussed above, a corresponding presence entry is deleted for example in the third database, so that the third database can also be kept compact.

According to an embodiment of the invention, the personal master data retrieved in step a) comprising a basic set of personal master data, the method further comprising receiving from the mobile telecommunication device a request for a supplemental set of personal master data for a person specified in the evacuation data, wherein the supplemental set of personal master data is not included in the evacuation data, wherein in response to the request for the supplemental set of personal master data, said supplemental set of personal master data is retrieved from the first database and transmitted to the mobile telecommunication device.

The request for the supplementary set of personal master data can, for example, be contained in the aforementioned update request of the mobile telecommunication device. As a result, the data transmitted to the mobile telecommunication device in normal operation may contain only basic data, which initially enable a person to be uniquely identified and localized. However, if requested, further data concerning the person or persons entered in the evacuation data will be transmitted to the mobile telecommunications device so that, for example, a head of operations of the fire brigade is able to obtain a more accurate picture of the rescue or evacuation measures to be taken with regard to persons in a hazard zone.

For example, the basic set of personal master data comprises the civil name of the person and the supplementary set of personal master data comprises a photograph of the person and/or pre-existing diseases of the person and/or an age of the person and/or contact data of a superior person and/or an identifier of a communication device via which the person can be contacted when present in the hazard zone. The identifier of the communication device can be for example a mobile phone of the person, or a pager and in general any electronic device which enables the transmission of information to the person in almost real time. If the supplementary set of personal master data contains information related to one or more pre-existing diseases of the person, this could have the advantage of giving the operations director a rough overview of whether evacuation or rescue measures with a particular urgency taking into account the pre-existing disease or with the appropriate medication and treatment equipment are required or necessary in the hazard zone. If, for example, a respiratory disease is known as a pre-existing disease and it must be assumed that smoke development can be expected in several hazard zones with persons present there, hazard zones with persons suffering from respiratory diseases could be assigned a higher priority during evacuation. If the database has a history of pre-existing diabetic disease, an appropriate evacuation team could carry insulin when evacuating that person to counteract diabetic shock, if it has occurred, without requesting and initiating emergency procedures at a later stage.

The indication of contact details of a superior of the person could have the advantage that the superior is usually informed, on the basis of his instructional function, why the person concerned is in the hazard zone and with which tasks he is entrusted there. This could enable the emergency services to carry out evacuation measures in an even more spatially targeted manner, especially in the case of larger hazard zones, since it could then be restricted in which restricted spatial zone of the hazard zone this person is located.

According to an embodiment of the invention, the method further comprising receiving a request for supplemental data specific to a respective hazard zone specified in the evacuation data from the mobile telecommunication device, wherein the supplemental data specific to the respective hazard zone are not included in the evacuation data, wherein in response to the request for supplemental data specific to the respective hazard zone said supplemental data for the respective hazard zone are retrieved from the second database and transmitted to the mobile telecommunication device.

Here the same advantage could apply with regard to the minimized data volume as discussed above with regard to the basic set of person master data. The basic set of data specifying the respective hazard zone makes it possible in principle to identify the hazard zone as such. The supplemental data could enable emergency personnel to carry out such evacuation in a more targeted and effective manner and, where necessary, to carry out efficiently hazard removal measures such as fire-fighting measures.

For instance, the supplemental data specific to the respective hazard zone include at least one of the following: hazardous goods in this hazard zone, technical facilities located in this hazard zone, fire-fighting equipment installed in this hazard zone, communication equipment installed in this hazard zone, surveillance cameras installed in this hazard zone. The installed communication equipment may enable emergency personnel to contact and give instructions directly to persons in the hazard zone.

According to an embodiment of the invention, each of the hazard zones is a spatially limited zone with one or more accesses, each of which is assigned to one of the reader devices. This could have the advantage of preventing a person from having access to a hazard zone without having had the opportunity to register beforehand. This would also allow for a high actuality of the evacuation data and a high probability that the evacuation data reflect the real presence of persons in hazard zones.

According to an embodiment of the invention, after a predetermined second period of time has elapsed after the registration of the ID token of the person, the evacuation module sends an alarm message to at least one predetermined receiver, such as the mobile telecommunication device. This could have the advantage that it would be possible to register events that prevent persons from leaving the hazard zones on their own. In particularly hazardous zones, for example, due to high radiation exposure, a requirement could be that a person must not stay there for more than a predetermined period of time, such as 5 minutes. If the person is not deregistered from this hazard zone within the second predetermined period of time, such as these 5 minutes, the system could automatically send the alarm message so that rescue measures for the person concerned can be initiated immediately, since in this case it must be assumed that the person is no longer able to leave the hazard zone on his own, for example due to a heart attack.

It is also possible in a variant, that for particularly hazarded zones, similar to a dead man's switch, a person must register with the ID token within the predetermined second period of time with cyclic repetitions in order to signal that he or she has no health damage. If this second predetermined period expires without the person having deregistered or re-registered the ID token to indicate the presence, it must be assumed that something has happened to this person, so that measures for evacuation from the hazard zone can then also be initiated in accordance with the person's evacuation measures. As a scenario, for example, the hazard of a development of a gas toxic to humans in the hazard zone could be conceivable, whereby there is a hazard that the person concerned will no longer be able to get to safety in good time if the gas develops accordingly.

In another aspect the invention relates to a method for operating a mobile telecommunication device, wherein the telecommunication device comprises a processor and a memory, wherein the memory stores instructions in a form of an evacuation application , wherein the instructions are executable by the processor, wherein the execution of the instructions by the processor causes mobile telecommunication device to:

receive evacuation data from a server, the evacuation data comprising personal master data of persons, whose presence in hazard zones is electronically registered by reader devices assigned to the hazard zones, the evacuation data further comprising data specific to the hazard zones, the data specific to the hazard zone being assigned to the person-specific data in accordance with the presence of the persons in the respective hazard zone, buffer the evacuation data by the mobile telecommunication device, generate an evacuation list on a graphical user interface of the mobile telecommunications device in response to a user request, the evacuation list comprising the evacuation data.

According to an embodiment of the invention, the execution of the instructions by the processor further causes the mobile telecommunication device to transmit an update request to the server in response to a further user request, wherein in response to the update request, updated evacuation data is received from the server.

In another aspect the invention relates to a Computer program product having instructions executable by a processor to perform the method described above.

In another aspect, the invention relates to a system for controlling access to hazard zones, wherein the system comprises a server, wherein the server comprises a processor and a memory, wherein the memory stores instructions in a form of an evacuation module, wherein the instructions are executable by the processor, wherein system is operable for electronically registering the presence of persons in the hazard zones by reader devices assigned to the hazard zones, wherein the registering is performed by reading ID tokens by the reader devices, wherein the ID tokens are uniquely associated with the persons, wherein the execution of the instructions by the processor causes the server to:

a) retrieve, for the persons whose presence is registered, person-specific data from at least one first database, wherein the person-specific data comprise personal master data, b) retrieve, for the reader devices used to register the presence of the persons, data specific to the respective hazard zone from at least one second database, wherein the data specific to the hazard zone comprise location information of the hazard zone, c) generate evacuation data, the evacuation data comprising the personal master data of the persons whose presence is registered and the data specific to the hazard zone, the data specific to the hazard zone being assigned to the person-specific data in accordance with the presence of the persons in the respective hazard zone, d) transmit the evacuation data to a mobile telecommunication device for buffering of the evacuation data by the mobile telecommunication device, e) repeat automatically and cyclically the steps a)-d) at specified time intervals.

In another aspect the invention relates to a mobile telecommunication device, wherein the telecommunication device comprises a processor and a memory, wherein the memory stores instructions in s form of an evacuation application, wherein the instructions are executable by the processor, wherein execution of the instructions by the processor causes the mobile telecommunications device to:

receive evacuation data from a server, the evacuation data comprising personal master data of persons whose presence in hazard zones is electronically registered by reader devices assigned to the hazard zones and data specific to the hazard zones, the data specific to the hazard zone being assigned to the person-specific data in accordance with the presence of the persons in the respective hazard zone, buffer the evacuation data by the mobile telecommunication device, generate an evacuation list on a graphical user interface of the mobile telecommunication device in response to a user request, the evacuation list comprising the evacuation data.

It should be noted that the embodiments described above can be combined in any way as long as these combinations are not mutually exclusive.

In the following, the preferred embodiments of the invention are explained in more detail using the drawings, wherein.

In the following, similar elements are marked with the same reference numbers.

Figure 1:
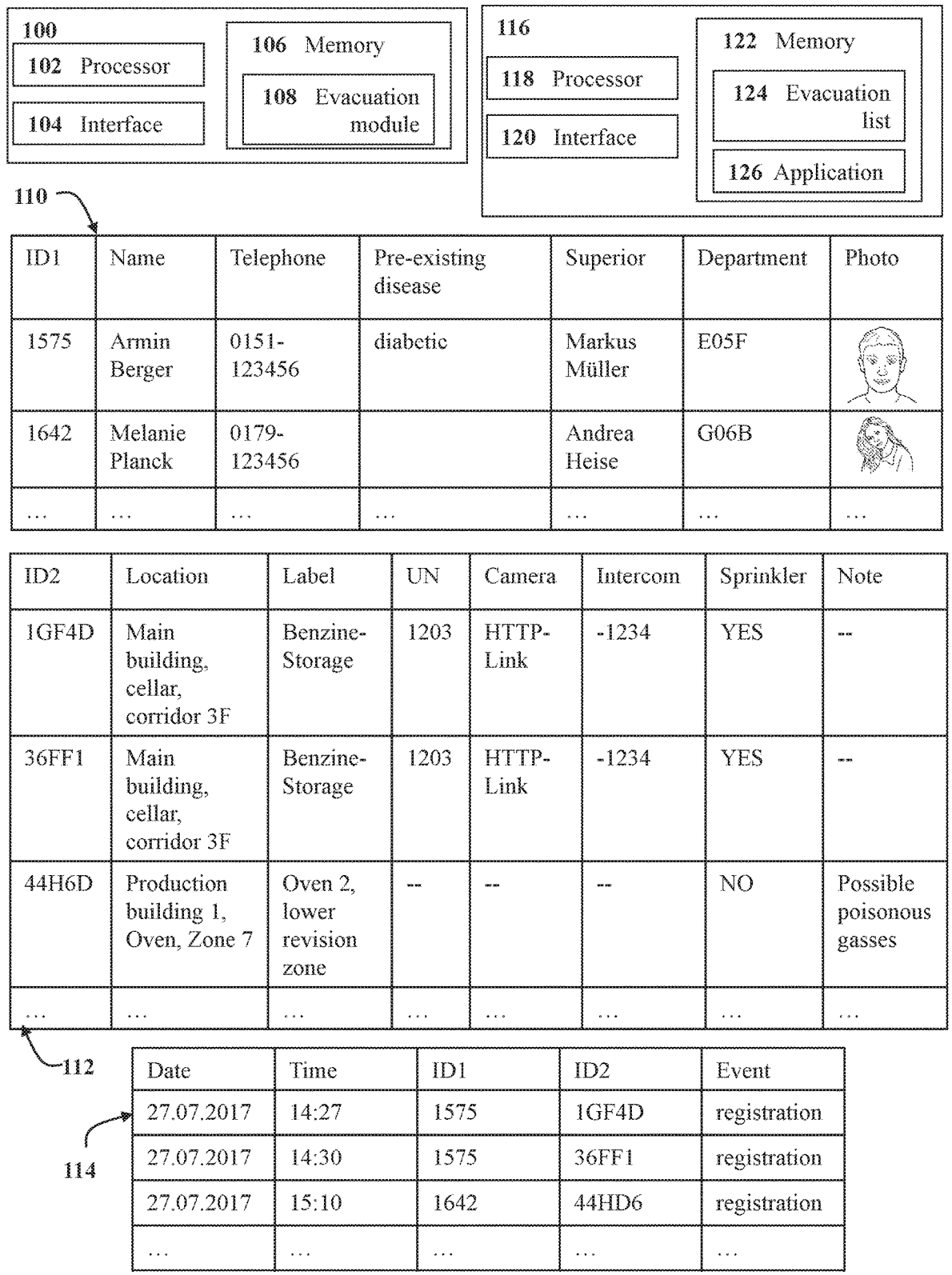
FIG. 1 is a block diagram of a system for controlling access to hazard zones.

FIG. 1 shows a system with which it is possible to implement access control to hazard zones in such a way that on a mobile telecommunication device 116, such as a smartphone, evacuation data are available in the form of an evacuation list 124 at any time. For the sake of simplicity, the starting point is the situation illustrated in FIG. 2 with the arrangement of two separate hazard zones 202 and 206. These hazard zones 202 and 206 are located for example in a building 200. Hazard zone 202 can be entered and exited via a total of two entrances. To each of these entrances a reader device is assigned, which is exemplarily marked with reference number 208 in FIG. 3.

Each reader device 208 consists in turn of a set of two receivers 210 and 212, wherein the receiver 210 serves to register an ID token, for example an RFID chip personalized for the user, and the receiver 212 serves to deregister the RFID chip. Registering or deregistering the RFID chip corresponds to registration of the person entering zone 202 or the person leaving zone 202.

Due to the two entrances, there are now two readers 208.1 and 208.2 at the respective entrances to hazard zone 202.

Figure 2:
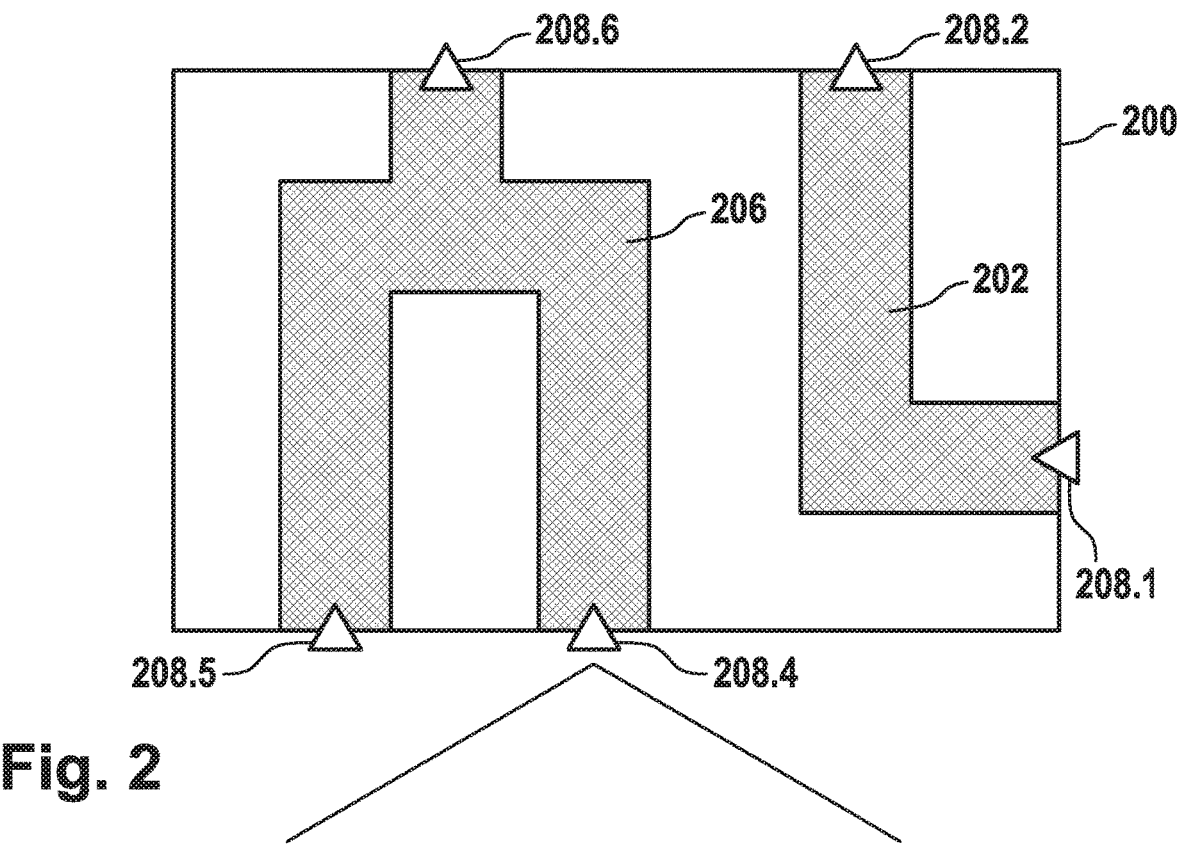
FIG. 2 shows a schematic representation of hazard zones.

FIG. 2 also shows a hazard zone 206, which now has three different entrances, with a corresponding reader devices arranged at each of the entrances, namely the 208.4, 208.5 and 208.6 reader devices.

The hazard zones 202 and 206 contain, as can be seen, several contiguous corridors, thus forming a so-called zone, which can be entered or left via several entrances.

The aim is now to ensure that in the event of an evacuation, for example, an operations commander of a plant fire brigade is in a position to make a statement as in which hazard zones there is a high probability that persons are still present and which hazard zones are no longer to be secured separately by a rescue team. For this purpose, the Server 100 shown in FIG. 1 is provided, wherein the Server 100 has a processor 102 and a communication interface 104. Furthermore, a memory 106 is allocated to the server, which contains an evacuation module 108 in the form of computer executable instructions. The server is configured to access various databases 110, 112 and 114 via its 104 interface. In addition, the Server 100 is configured to communicate with a 116 mobile telecommunication device via interface 104. It also has a corresponding communication interface 120, so that communication between the server and the mobile telecommunication device can be implemented. In the following it is assumed that the server 100 operates using the database 114. However, this is not absolutely necessary, but helpful for a clear description.

If, for example, a person enters the hazard zone 202 shown in FIG. 2, this person registers at reader device 208.1. The following assumes that the unique identifier ID2 "1GF4D" is assigned to the reader device 208.1. This unique identifier is also contained in database 112. Furthermore, it was assumed that the person registering with his ID token at reader device 208.1 is Mr. "Armin Berger" and that the unique identifier ID1 "1575" is assigned to his ID token.

Armin Berger's registration at reader device 208.1 is communicated to server 100 by this reader device. The reader device transmits its ID2 identifier and the ID1 identifier of Mr. Berger to the server 100. Using the instructions contained in the evacuation module 108, the server 100 is then able to retrieve the first name and surname of Mr. Berger, i.e. these personal master data, from the database 110. By accessing database 112, the server can also access database 112 by means of the instructions contained in evacuation module 108, and by means of the ID2 identifier it can record the location of the hazard zone which Mr. Berger has just entered—in this example, the location is "main building, cellar, corridor 3F". At least these two information sets form the basis for the generation of evacuation data, whereby these evacuation data are then transmitted in the form of an evacuation list 124 to the mobile telecommunication device 116. The mobile telecommunication device has a processor 118 and a memory 122, the memory 122 contains/stores an application 126, wherein the steps described below and executed by the mobile telecommunication device 116 result from execution by the processor of the program instructions of the application 126.

After receiving the evacuation list 124, the mobile telecommunication device 116 will buffer (store temporarily) the evacuation list 124 in a memory 122 of the mobile telecommunication device. The buffering will be maintained until either an active delete command is received from the user or a new updated evacuation list is received, whereupon the old evacuation list can be overwritten. Of course, it is also possible for one or more different versions of evacuation lists to remain temporarily stored on the mobile telecommunications device for a certain period of time.

Figure 4:
FIG. 4 is a view of a graphical user interface of a mobile communication device.

Application 126 is also operable, upon user request, to display a graphical user interface on an undetailed display of the mobile telecommunications device 116. Examples of the graphical user interface are shown in FIGS. 4a, 4b and 4c in the form of an evacuation application. The graphical user interface shown in FIG. 4a shows an example of how, in the simplest case, all persons present in hazard zones can be displayed at any time using evacuation list 124. In this case, the displaying of a photograph and a time at which a corresponding hazard zone was entered is optional.

If a user of the graphical user interface now wants to request further information about that person, in this example Mr. Berger, who is obviously in the hazard zone 202 at the moment, a corresponding request can be sent from the mobile telecommunications device 116 to the server 100 via the graphical user interface. In response to this, the server 100 will return additional information on Mr. Berger's person as well as on the hazard zone 202 to the mobile telecommunication device. Corresponding examples of the returned data and the correspondingly supplemented graphical user interface are shown in FIGS. 4b and 4c. For this purpose, the database 110 contains further information on all persons who are equipped with corresponding ID tokens and who could enter the hazard zones. In addition to the civil name mentioned above, this includes, for example, a telephone number where the person can be reached as well as an indication of any pre-existing diseases which could play a role in the event of evacuation. The database also contains the name of the superior and optionally his or her contact information, such as telephone number, as well as an indication of the employment department of the relevant company in which the person works. A photograph can also be stored in the database, which is then transmitted to the mobile telecommunication device on request.

Similarly, the 112 database also has further information on the hazard zones, such as a description of what goods are stored there or whether this is a specific machine zone. In table 112, this is subsumed in the column "Marking". The database may also contain, for example, a description of the hazardous substances to be expected in each of the hazard zones. In the example of database 112, a UN number is given here, wherein the UN number 1203 stands for the storage of petrol. The database 112 also contains, as far as available for the hazard zones, information as to whether and how a corresponding camera located in the hazard zone or several cameras can be reached (http link), as well as information as to whether an intercom or a communication device such as a telephone is installed there and how this can be reached, for example, via which telephone number. Also important for firefighting could be the indication whether a sprinkler system is installed in this zone as well as the indication of further information "remarks" which could be relevant in the event of evacuation with regard to persons located there.

The database 112 contains two identifiers ID2 for zone 202 "Main building, cellar, corridor 3F", namely the first identifier for reader device 208.1 and the second identifier for reader device 208.2.

The database 114 is used to store the presence of persons in the hazard zones. The table shows that on 27 Apr. 2017, at 14:27, Mr. Berger entered zone 202 through the entrance, which was equipped with the 208.1 reader. It is shown hatched that Mr. Berger left hazard zone 202 3 minutes later through the door to which the reader 208.2 is assigned. The hatching indicates here that such storing of a leaving of the zone is not compellingly necessary and it can be sufficient instead also to delete only the entry concerning the registration procedure. In this respect, the database 114 can be reduced to an indication of the hazard zones in which persons are present, because in the event of evacuation it may not be so important to know in which hazard zones persons were present at some time in the past. Nevertheless, it is still possible to store this in the database 114. Even the specification of date and time is optional when it comes to making the database 114 as compact as possible.

The advantage of using the database 114 is that the registration and deregistration processes of persons to hazard zones can be tracked and collected here in order to then generate the evacuation data at certain time intervals using the database 114 and send it to the mobile telecommunication device 116. This means that the mobile telecommunication device does not have to be permanently supplied with evacuation lists in real time, but it can be sufficient here, for example, for an updated evacuation list to be sent to the mobile telecommunication device every 15 minutes. It is also possible that at predetermined time intervals only changes in data are transmitted to the mobile telecommunications device, so that evacuation lists do not have to be transmitted in their entire length, but only an indication of what information has arisen since the last change. Of course, this requires the existence of an evacuation list 124 on the mobile telecommunication device 116, which forms the basis for the changes to be made to the list. This can be achieved by the server 100 sending a complete evacuation list to the mobile telecommunications device at predetermined longer time intervals and/or the mobile telecommunication device requesting a complete evacuation list whenever it misses the last update from the server. Missing the last evacuation list could result from the mobile telecommunication device not being in communication with the server for a certain period of time.

Figure 5:
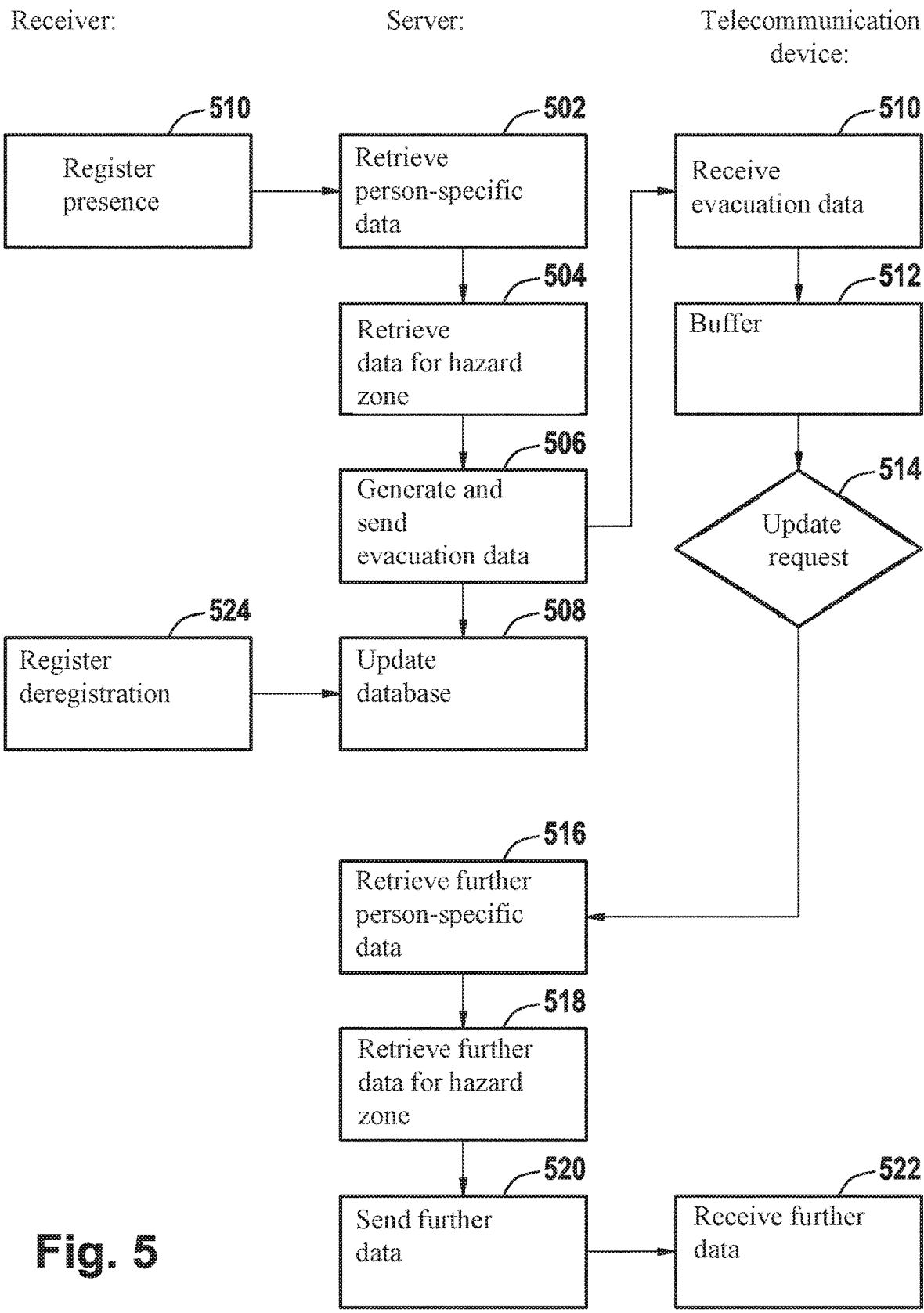
FIG. 5 is low chart of a method for controlling access to hazard zones.

The method described above is summarized in the following with reference to the flow diagram of FIG. 5 as follows. In block 100, the presence of a person is registered, for example the person Armin Berger with ID1 "1575" in the hazard zone 202 with ID2 "1GF4D". The registration of the presence is transmitted to the server, which in step 502 retrieves person-specific data such as the name associated with this unique identifier from a corresponding database on the basis of the ID1. Also, in step 104, the server will retrieve data for the hazard zone uniquely specified with ID 2. The server will then generate evacuation data from the person-specific data and the data for the hazard zone in step 406 and send this to the telecommunication device. In step 510, the telecommunication device receives the evacuation data and stores it in its memory in step 512. The data is stored there permanently.

If an update request is received from a user of the telecommunication device via a graphical user interface in step 514, the telecommunication device sends a corresponding request to the server. After receiving this request, in step 516 the server will retrieve further personal data from the corresponding database and in step 518 further data for the hazard zone from the corresponding database and in step 520 these further data will be transmitted back to the telecommunication device. The mobile telecommunication device receives this additional data in step 522 and can then display it on its graphical user interface.

It should be noted that the update request of step 514 may relate to individual persons in hazard zones, but may also relate to the entire available evacuation list.

For an illustrative description of the invention, various embodiments of the invention are again summarized as follows:

To put it simple, all persons entering the premises of a company with hazard zones receive a personalized ID card. This personalized badge corresponds to the ID token. Identity card number (ID1) and personal data such as name, employer and mobile phone number are documented in one or more databases, e.g. database 110, with secure access. For example, the company's employees can be stored in a central personnel database, the data of external persons in a central visitor database.

Figure 3:
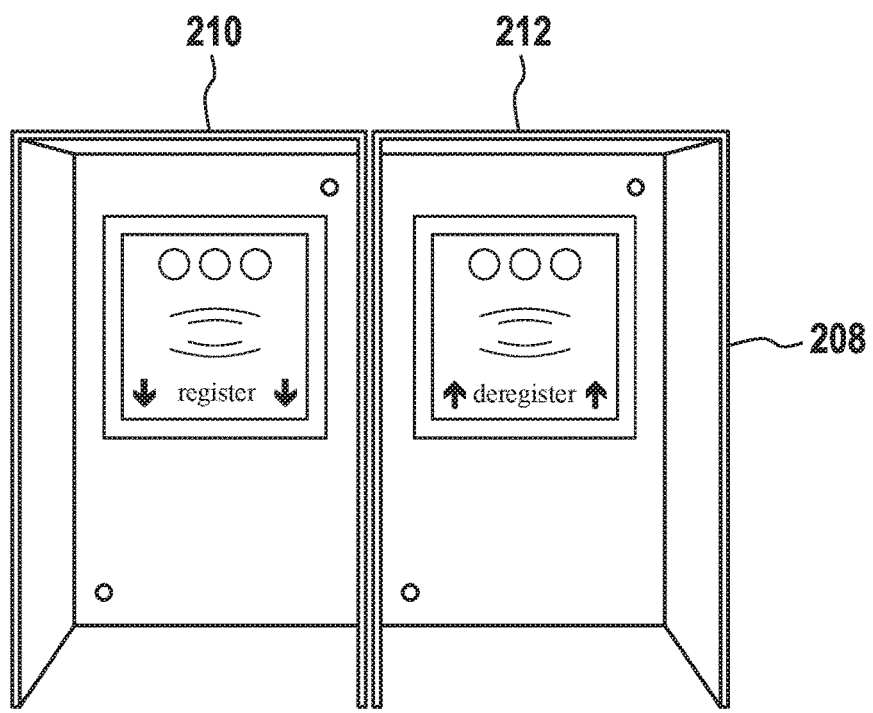
FIG. 3 shows a schematic representation of a reader device with receivers.

All persons entering a hazard zone register upon entrance using their personalized ID card at the corresponding installed card readers, as shown in FIG. 3. For example, the 210 card reader may be highlighted with red to visually indicate that a registration process is taking place. When leaving a hazard zone, the 212 card reader, which is highlighted with green, is used to deregister and signal that the person is safe. During the registration and deregistration process, the card reader reads the ID1 of the ID card and stores this unique ID1 as well as the unique number of the card reader and optionally date/time in a database such as the database 114, wherein the stored data are access protected. For example, the database 114 is an SQL access database.

In the event of an evacuation, the head of operations can use the corresponding application 126 already on the way to the site of operation to obtain an overview of the persons who have registered via the respective reader devices in the corresponding hazard zones and have not deregistered by the time the database query is made. The query can be updated online by the head of operations by pressing a button, so that he always has an up-to-date overview of how many people are in the hazard zones in total, how many people are still in the respective hazard zones in detail, and also of personal information on the people who are still in the hazard zones.

It should be noted that the evacuation lists can, of course, not only be used on a mobile telecommunications device, but also, for example, on an emergency control computer of the fire brigade or any other computer.

Since the evacuation lists are now available, the head of operations can make a statement on the current situation of persons in the hazard zones, in particular answer the question of how many persons are in which hazard zone at any given time. Since the head of operations recognizes how many people are in which hazard zones, further operations can be prioritized. The head of operations can use the retrieval of personal information directly on site as follows:

A photo of the person in the hazard zone enables visual control of whether the employee has left the hazard zone without deregistering. There may be a procedural instruction that the person must then immediately report back to the head of operations.

Name and telephone number of the person who is still in the hazard zone: This enables the head of operations to contact the person with the smartphone directly via the application 126 and request information on the person's current state of health and current location status.

The superior's number and telephone number: This allows the head of operations to contact the person's superior using the smartphone directly via the application 126 and request information about the services and the hazard zone, thus further restricting the hazard zone if necessary. The latter has in particular the advantage that in the case of larger hazard zones for a specific service, such as filling a liquid into container 123, it is clear to the head of operations where exactly in the hazard zone this evidently takes place.

Name of the card reader on which the person registered when entering the cellar: This has the advantage that the head of operations can lead his task team more specifically to the person's supposed location.

Overall, the information available to the head of operations enables him to make high quality decisions about the need for additional operational teams. In addition, the danger for the own rescue teams is reduced, since these either do not have to be sent at all or only purposefully into appropriate hazard zones. The duration of operation and thus the interruption of production are significantly shortened and costs are reduced, since not all hazard zones need to be controlled on the basis of the available information.

The precondition for this is that all cellar zones are electronically recorded and documented. In coordination with the responsible technical departments, the plant fire brigade and the work safety specialist, contiguous hazard areas (=hazard zones) should be identified and clearly labeled. Two card readers should be mounted in color-coded protective frames at each entrance and exit to hazard zones, see FIG. 3.

The application 126 can have for example a search function, in order to search in a fast and reliable way for certain persons. It should be possible to sort the evacuation lists by date in ascending and descending order, which makes it possible to retrieve information in a targeted manner. The mobile telecommunications device can communicate with the Server 100 via the GSM or UMTS data network, but also via WLAN or Bluetooth.

A further possible application of the Server 100 is that, by using additional registration options for members of a company's plant fire brigade, the possibility is created to indicate that and whether they are available for an appropriate fire brigade deployment by means of corresponding registration at corresponding readers devices. This makes it possible to call up the persons who belong to the plant fire brigade team and are available for deployment (fire brigade list) at any desired time. With the help of this function, the head of operations can decide whether and to what extent further rescue teams can be deployed. The evacuation module 108 and optionally also the application 126 directly access data stored in different databases, such as the databases 110, 112 and 114. It is therefore entirely possible that, in order to provide further information regarding the hazard zones or the persons located in the hazard zones, the mobile telecommunication device 116 directly accesses the corresponding databases and retrieves this data. As described above, however, it is also possible that this is done via the server 100.

In principle, proprietary data can be linked with each other via SQL queries as follows, whereby the primary key for all data records is the personalized and unique ID1 of the persons:

The server process cyclically retrieves the identification data as well as all personal data (name, organizational unit, photo, landline telephone number, mobile phone number, superior) of all employees from the central database and the identification data and the personal data (name, employer, mobile phone number) of all registered visitors and system partners from the respective database. In this case, both an employee database and a visitor database can be used separately. In addition, a current allocation table, card reader (differentiated according to registration and deregistration) for the corresponding hazard zone is maintained, see Table 112.

When retrieving or updating the list, the server retrieves the registration events of all access readers and as an option of time recording devices for the past 24 hours from the access database and generates the respective lists using this information, which can be updated, if required, by the user of the mobile telecommunications device 116 by pressing a button.

If, after a person has registered in a hazard zone, a registration is made for this person using another access reader of a meeting room or pithead baths or a time recording terminal, the person is deregistered from the previous hazard zone because he or she cannot physically be in the hazard zone any more, for example he or she has forgotten to deregister. If, in addition, after a registration of the presence of a person in a hazard zone 1, a further registration of the presence of the same person in a hazard zone 2 takes place without deregistration, then the hazard zone 2 is outputted as the current whereabouts. It is also possible that different ID cards, such as plant ID cards, are correlated, i.e. when registering with a plant ID card and deregistering with a key fob, which has an RFID chip with ID1, the personalized employee is taken into account, whereby this correlation of different event types results in a high probability of the presence of persons in hazard zones.

Application 126 can also include the option for authorized plant security and fire brigade employees to call up status information on all members of the plant fire brigade. This can be updated automatically every 300 seconds, for example, or manually online by pressing a button. The head of operations has a permanent overview of the number of deployable personnel and can also request reinforcements directly from the operation site or contact colleagues via the GSM network using the stored telephone number. If a member reaches the plant fire brigade's operations center in the event of an alarm, he registers there with his plant ID card in a separate card reader and the presence status "member of the plant fire brigade" is determined via integrated database queries via the central server 100 in the same way as "access control/evacuation".

LIST OF REFERENCE NUMBERS

100 Server
102 Processor
104 Interface
106 Memory
108 Evacuation module
110 Database
112 Database
114 Database
116 Mobile telecommunication device
118 Processor
120 Interface
122 Memory
124 Evacuation list
126 Application
200 Buildings
202 Hazard zone
206 Hazard zone
208 Reader device
210 Receiver
212 Receiver

The invention claimed is:

1. A system for controlling access to hazard zones, the system comprising a server, the server comprising a processor and a memory, the memory storing computer readable instructions in a form of an evacuation module, the computer readable instructions being executable by the processor, wherein system is operable for electronically registering the presence of persons in the hazard zones by reader devices assigned to the hazard zones, the registering being performed by reading ID tokens by the reader devices, the ID tokens being uniquely associated with the persons, each of the reader devices comprising a set of two receivers, for each of the reader devices, a first of the receivers is exclusively assigned to a registration of the ID tokens for the respective hazard zone and a second of the receivers is exclusively assigned to a deregistration of the ID tokens for the respective hazard zone, a person associated with one of the ID tokens is deemed to be present in the respective hazard zone when the ID token of that person has been read by the first receiver, and a person associated with one of the ID tokens is deemed to be no longer present in the respective hazard zone when the ID token of that person has been read by the second receiver, wherein the execution of the computer readable instructions by the processor causes the server to:
  a) retrieve, for the persons whose presence is registered, person-specific data from at least one first database, wherein the person-specific data comprise personal master data,
  b) retrieve, for the reader devices used to register the presence of the persons, data specific to the respective hazard zone from at least one second database, wherein the data specific to the hazard zone comprise location information of the hazard zone,
  c) generate evacuation data, the evacuation data comprising the personal master data of the persons whose presence is registered and the data specific to the hazard zone, the data specific to the hazard zone being assigned to the person-specific data in accordance with the presence of the persons in the respective hazard zone,
  d) transmit the evacuation data to a mobile telecommunication device for buffering of the evacuation data by the mobile telecommunication device, and
  e) repeat automatically and cyclically the steps a)-d) at specified time intervals.

2. A method for controlling access to hazard zones by a server, the server comprising a processor and a memory, the memory storing instructions in a form of an evacuation module, the instructions being executable by the processor, the method comprising electronically registering the presence of persons in the hazard zones by reader devices assigned to the hazard zones, the registering being performed by reading ID tokens uniquely associated with the persons by the reader devices, each of the reader devices comprising a set of two receivers, for each of the reader devices, a first of the receivers is exclusively assigned to a registration of the ID tokens for the respective hazard zone and a second of the receivers is exclusively assigned to a deregistration of the ID tokens for the respective hazard zone, a person associated with one of the ID tokens is deemed to be present in the respective hazard zone when the ID token of that person has been read by the first receiver, and a person associated with one of the ID tokens is deemed to be no longer present in the respective hazard zone when the ID token of that person has been read by the second receiver, wherein the execution of the instructions by the processor causes the server to:
  a) retrieve, for the persons whose presence is registered, person-specific data from at least one first database, wherein the person-specific data comprise personal master data,
  b) retrieve, for the reader devices used to register the presence of the persons, data specific to the respective hazard zone from at least one second database, wherein the data specific to the hazard zone comprise location information of the hazard zone,
  c) generate evacuation data, the evacuation data comprising the personal master data of the persons whose presence is registered and the data specific to the hazard zone, the data specific to the hazard zone being assigned to the person-specific data in accordance with the presence of the persons in the respective hazard zone,
  d) transmit the evacuation data to a mobile telecommunication device for buffering of the evacuation data by the mobile telecommunication device, and
  e) repeat automatically and cyclically the steps a)-d) at specified time intervals.

3. The method of claim 2, wherein, on the basis of the transmitting of the evacuation data to the mobile telecommunication device, the evacuation data previously buffered in the mobile telecommunication device is overwritten by the currently transmitted evacuation data.

4. The method of claim 2, further comprising:
  receiving an update request from the mobile telecommunication device, wherein the steps a)-d) are repeated immediately upon the receiving of the update request irrespective of the cyclic repetition.

5. The method of claim 2, wherein the evacuation data is transmitted by a server to the mobile telecommunication device via a push mechanism.

6. The method of claim 2, wherein, for each of the reader devices, the set of receivers is spatially separated from each other such that simultaneous reading of a particular ID token by both receivers is avoided.

7. The method of claim 2, wherein
  the reader devices are configured to register the ID tokens for the respective hazard zone and for deregistering the ID tokens for the respective hazard zone; and
  a person associated with one of the ID tokens is deemed to be no longer present in the respective hazard zone,
  if the presence of the person associated with the ID token is registered in a zone other than the respective hazard zone, and/or
  if a predetermined first time interval after registration of the person's ID token has elapsed.

8. The method of claim 7, wherein the registering of the presence of the person associated with the ID token in a zone other than the respective hazard zone comprises:
  using one of the reader devices not associated with the respective hazard zone to re-register the ID token,
  registering the person associated with the ID token on a time recording terminal outside the respective hazard zone.

9. The method of claim 2, wherein
  the unique association of each ID token with the respective person is given by a unique identifier; and
  the retrieving of the person-specific data from the first database is performed using the unique identifier as the primary key from the first database.

10. The method of claim 9, wherein the registering of the presence of persons in the hazard zones comprises:
  reading the unique identifier provided by the ID token by one of the reading devices, wherein the reading is performed by near field communication between the ID token and the reader device.

11. The method of claim 8, wherein the registering of the person associated with the ID token on the time recording terminal comprises:
  recording the registration process of the person associated with the ID token on the time recording terminal by a time recording module; and
  communicating, to the evacuation module, said recorded registration process by the time recording module, the communicating comprising transmitting such an information, which enables the evacuation module to uniquely identify the person associated with the ID token directly or using the first database, wherein execution of the instructions of the evacuation module further causes the server to register the person associated with the ID token as no longer present in the respective hazard zone based on the transmitted information.

12. The method of claim 2, further comprising:
accessing a third database, wherein, for each of the hazard zones in which the presence of persons is registered, the third database comprises:
information obtained by reading the ID tokens, the information comprising a unique identification of the persons associated with the ID tokens,
a unique identification of the reader devices with which the information was acquired and read by the ID tokens and/or location information of the hazard zones for which the information was acquired by the ID tokens, and
a timestamp of a point in time at which the information was acquired and read by the ID tokens; and
wherein the retrieving of the person-specific data is performed using the unique identification of the person and the retrieving of the data specific to the respective hazard zone is performed using the unique identification of the reader device.

13. The method of claim 2, wherein the personal master data retrieved in step a) comprises a basic set of personal master data, and the method further comprises:
receiving from the mobile telecommunication device a request for a supplemental set of personal master data for a person specified in the evacuation data, wherein the supplemental set of personal master data is not included in the evacuation data, wherein in response to the request for the supplemental set of personal master data, said supplemental set of personal master data is retrieved from the first database and transmitted to the mobile telecommunication device.

14. The method of claim 13, wherein
the basic set of personal master data includes the civil name of the person,
the supplementary set of personal master data comprises a photograph of the person and/or pre-existing disease of the person and/or an age of the person and/or contact data of a superior of the person and/or an identifier of a communication device via which the person can be contacted when present in the hazard zone.

15. The method of the claim 2, the method further comprising:
receiving a request for supplemental data specific to a respective hazard zone specified in the evacuation data from the mobile telecommunication device, wherein
the supplemental data specific to the respective hazard zone are not included in the evacuation data, and
in response to the request for supplemental data specific to the respective hazard zone said supplemental data for the respective hazard zone are retrieved from the second database and transmitted to the mobile telecommunication device.

16. The method of claim 15, wherein the supplemental data specific to the respective hazard zone include at least one of the following:
hazardous goods in this hazard zone,
technical facilities located in this hazard zone,
fire-fighting equipments installed in this hazard zone,
communication equipments installed in this hazard zone, and
surveillance cameras installed in this hazard zone.

* * * * *